Feb. 3, 1970    J. R. EDMISTON    3,493,116
SWIMMING POOL FILTER
Original Filed Nov. 20, 1967    3 Sheets-Sheet 1

JAMES R. EDMISTON
INVENTOR.

BY R. E. Geauque
ATTORNEY

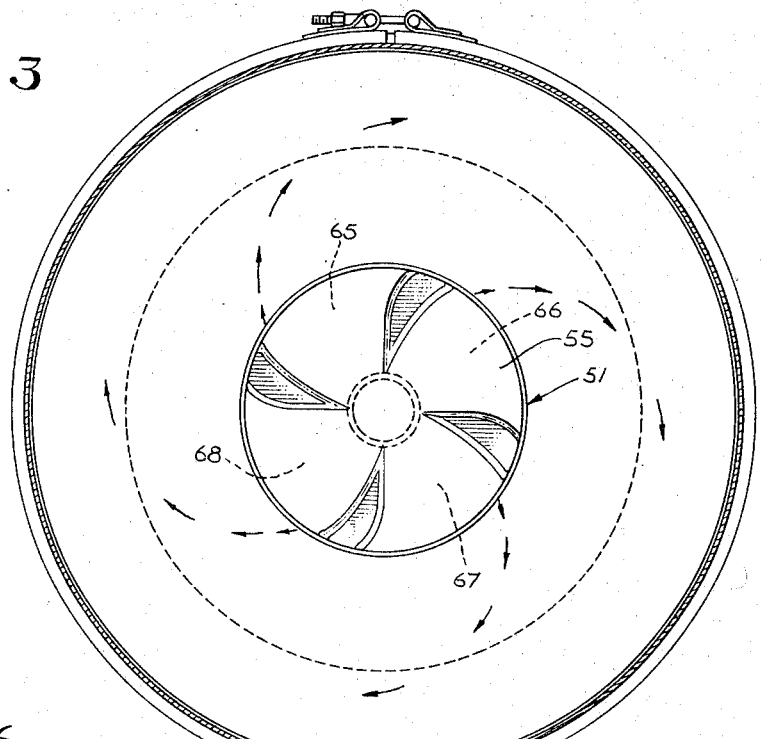
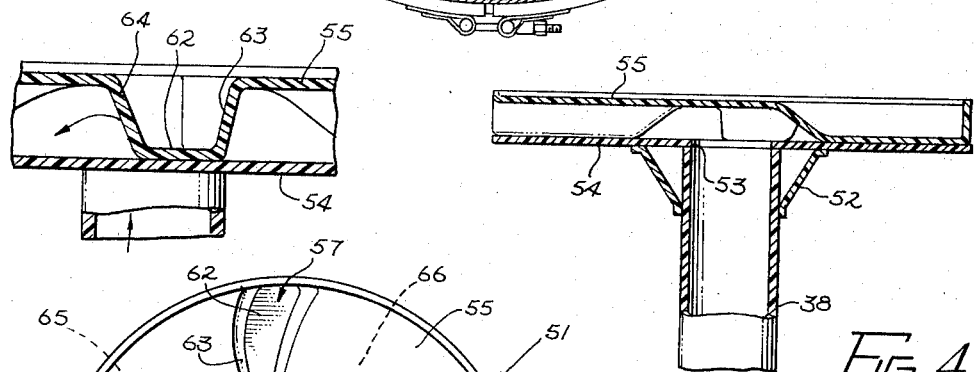
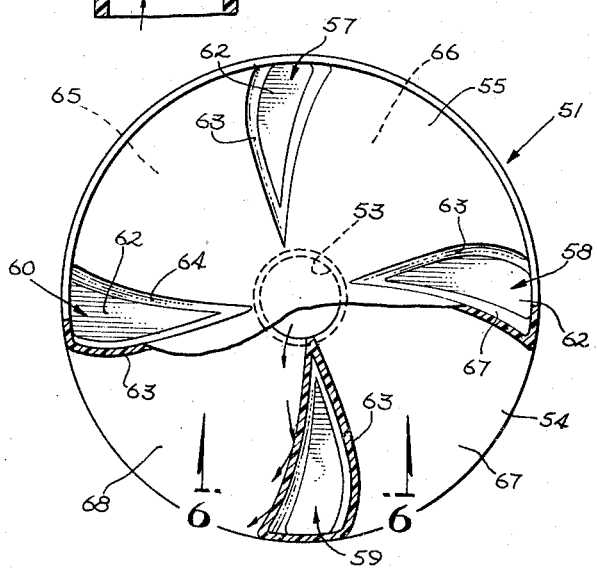

Feb. 3, 1970  J. R. EDMISTON  3,493,116
SWIMMING POOL FILTER
Original Filed Nov. 20, 1967  3 Sheets-Sheet 3

JAMES R. EDMISTON
INVENTOR

BY R. E. Geauque
ATTORNEY

United States Patent Office 3,493,116
Patented Feb. 3, 1970

3,493,116
SWIMMING POOL FILTER
James R. Edmiston, Sherman Oaks, Calif., assignor to Swimrite Manufacturing Co., Inc., Van Nuys, Calif., a corporation of California
Continuation of application Ser. No. 684,443, Nov. 20, 1967. This application Feb. 10, 1969, Ser. No. 805,392
Int. Cl. B01d 25/06
U.S. Cl. 210—266      12 Claims

ABSTRACT OF THE DISCLOSURE

A filter having a generally spherical tank with a lower section containing a compact bed of fine sand below an upper flow chamber into which liquid is introduced through an overdrain to create a swirling, downward flow all the way to the upper surface of the sand. Below the sand is a support formed by a grid-like frame structure covered by multiple layers of fabric, the support being above the bottom of the tank so that filtered water normally is withdrawn from a lower flow chamber into which backwashing water is introduced after the sand becomes clogged with filtered-out solids.

---

CROSS-REFERENCE TO RELATED APPLICATION

This is a continuation of my copending application Ser. No. 684,443 filed Nov. 20, 1967, and entitled Sand Filter, now abandoned.

BACKGROUND OF THE INVENTION

This invention relates to filters and, more particularly, to the filtration of liquid such as the water of a swimming pool by passing the water through a tank containing a bed of granular filter material, preferably sand of selected grain size, the water being admitted to the tank on one side of the bed and forced through the bed for removal of entrained solid particles by the straining action of the sand, and then being withdrawn from the tank on the other side of the bed.

Sand filters have been proposed in the past for swimmining pool filtration, such filter typically using a layer of relatively coarse sand that customarily either has been backed by various sizes of rock into which the water is drawn from the tank or has had perforated outlet pipes embedded in the sand. Where only a relatively small depth of sand has been used, holes or channels have developed in the sand to permit a substantial portion of the water to pass through without being cleaned. When greater depths of sand have been used, a layer of mud has been found to accumulate relatively rapidly on top of the sand, clogging the upper surface of the bed and reducing the filtering capacity to an extent requiring frequent backwashing of the filter. Because of the limited filtering capacity available between backwashes, such filters have met with limited success.

Moreover, the manner of separation of the sand from the tank outlet also has been less than satisfactory. In addition, a backwashing flow from perforated pipes beneath the sand concentrates the flow with resulting upward channeling of the backwashing liquid through limited parts of the sand rather than producing the even distribution necessary for thorough cleaning.

SUMMARY OF THE INVENTION

The present invention provides a novel approach to the problems inherent in sand filters, and provides a filter in which filtered-out solids are driven, with a gently swirling action, a substantial distance into the upper portion of the bed, using substantially the same operating pressures as have been used in the past but continuously scrubbing and scouring the top surface of the sand to prevent the solids from simply accumulating in a choking layer. In effect, a larger or deeper portion of the sand bed is made available to hold the accumulated solids. At the same time, the bed is maintained in a compact, substantially undisturbed bed to avoid agitation of filtered-out solids back into the body of liquid above the sand.

In addition, the sand is supported in a novel manner by an open framework disposed above the bottom of the tank and covered with at least two side-by-side layers of fine mesh fabric having openings smaller than the selected grain size. Although these fine openings tend to become clogged with sand, dirt and particularly algae growth, the two layers are mounted so that the central portions are loose and free to billow upwardly away from the supporting frame, and thus to rub against each other during backwashing in order to loosen the clogging substances and clean the fabric as an incident to the backwashing of the sand.

The invention also resides in the configuration of the novel inlet head, or overdrain, cooperating with the tank in producing the swirling in-flow for normal filtering operation; in the manner of distributing the reverse flow across the full area of the screen during backwashing of the sand; and in the particular configuration of the upper portion of the tank, in combination with the inlet head, for producing the proper swirling inlet flow.

Other objects and advantages will become apparent from the following detailed description, taken in conjunction with the accompanying drawings.

BRIEF DESCRIPTION OF THE DRAWINGS

FIG. 3 is a horizontal cross-section taken substantially along line 3—3 of FIG. 2 with a plan view of the overdrain;

FIG. 4 is an enlarged fragmentary cross-section taken substantially along the line 4—4 of FIG. 2;

FIG. 5 is an enlarged plan view of the overdrain, partly broken away and shown in cross-section;

FIG. 6 is an enlarged fragmentary sectional view taken substantially along the line 6—6 of FIG. 5;

DETAILED DESCRIPTION

Figure 1:
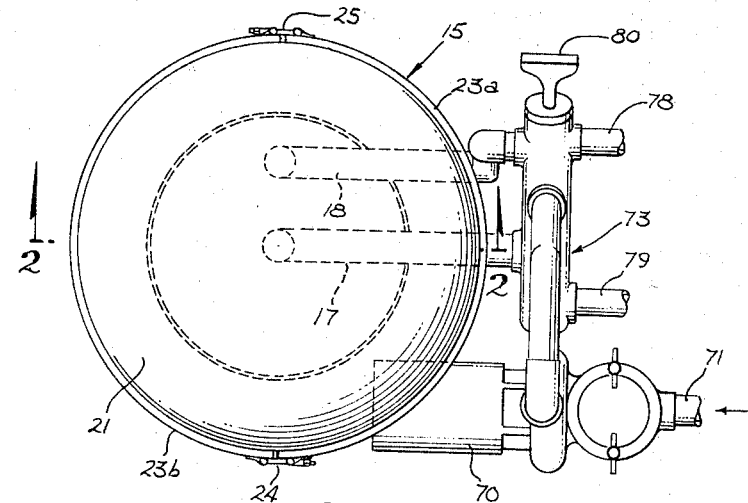
FIGURE 1 is a plan view of a filter apparatus embodying the novel features of the present invention.

As shown in the drawings for purposes of illustration, the invention is embodied in a sand filter 15 comprising generally a tank 16 having an inlet pipe 17 normally used to deliver liquid from a source such as a swimming pool (not shown) to the upper portion of the tank above a bed of sand 50 in the lower portion of the tank, and having an outlet pipe 18 opening into the tank below the sand bed. Then, after a period of time depending upon the degree of contamination of the water and the amount of water passed through the sand, the flow through the pipes 17 and 18 is reversed temporarily, in a generally conventional manner, to backwash the sand and remove accumulated solids for disposal to a sewer or a drywell (not shown).

The illustrative tank is formed by two cup-shaped sections 20 and 21 that are fitted together at their open ends and sealed by a gasket 22 that is held between outwardly flared edges of the sections by a circular clamping ring 23 formed in semi-circular sections 23a and 23b (see FIG. 1) which are pulled together around the tank by quick-release clamps 24 and 25. An internal band 27 (FIG. 2) is telescoped into and secured to the lower tank section 20 to extend upwardly in telescoped relation with the upper section 21 when the tank is assembled, thereby covering the inside of the joint between the tanks and permitting filling of the lower section with sand to a level even with or somewhat above the lower edge of the inner section.

Herein, the tank sections 20 and 21 are generally semispherical so as to form a generally spherical tank when assembled. For ease of assembly and enhanced strength, the spherical form is modified slightly to a cylindrical shape adjacent the joint between the sections and to a flattened shape at the upper and lower ends.

Figure 2:
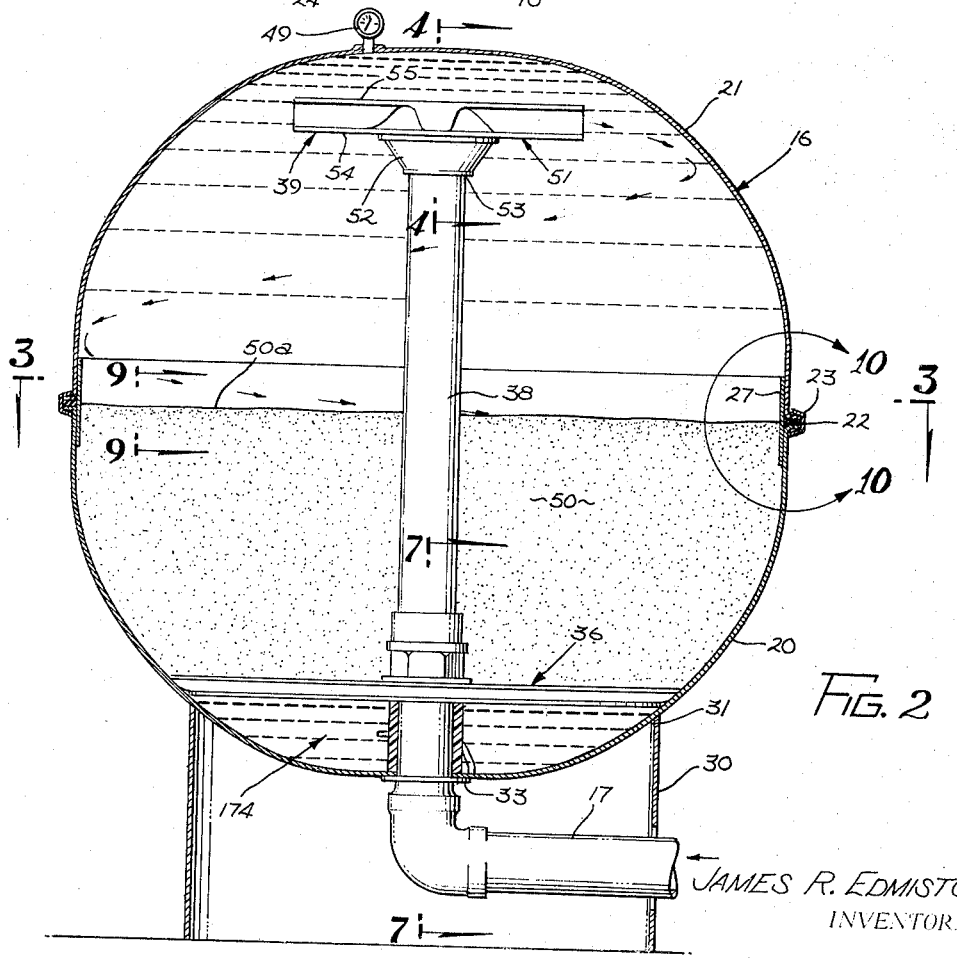
FIG. 2 is an enlarged fragmentary cross-section taken substantially along the line 2—2 of FIG. 1.
Figure 7:
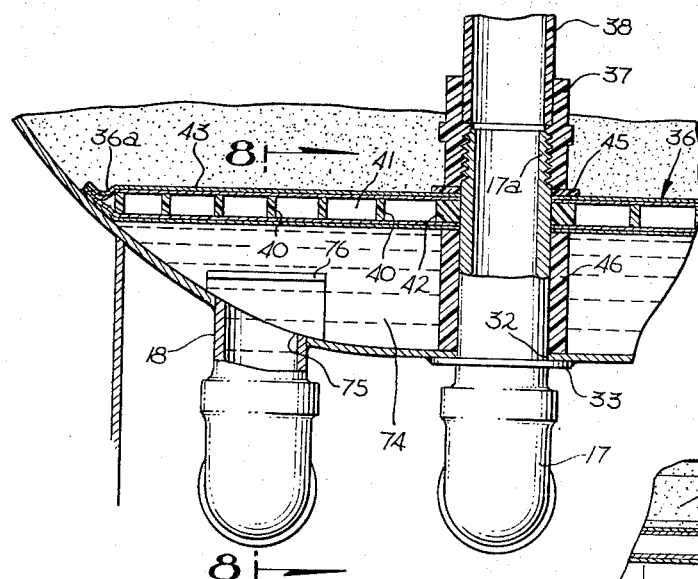
FIG. 7 is an enlarged fragmentary cross-section taken substantially along the line 7—7 of FIG. 2.
Figure 8:
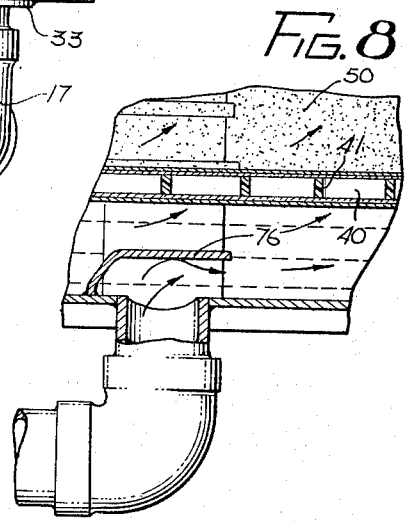
FIG. 8 is a fragmentary cross-section taken substantially along the line 8—8 of FIG. 7.

As shown most clearly in FIG. 2, the bottom section 20 is supported on an upstanding cylindrical base 30 which preferably is welded to the bottom section at 31, with the inlet and outlet pipes 17 and 18 passing into the base and then bent upwardly to extend into the tank, the inlet pipe 17 having an annular flange 33 which abuts against the underside of the tank. Inside the tank, and spaced above the bottom thereof, is a perforated sand support 36 through which the inlet pipe extends to a fitting 37 (FIG. 7) which is threaded onto the pipe above the support. An upright pipe 38, constituting an extension of the inlet pipe, is pressed into this fitting and disposed close to and coaxial with the threaded end portions 17a of the inlet pipe to receive the incoming liquid and carry it upwardly through the sand bed to an overdrain 39 located in the upper flow chamber defined by the upper section 21 of the tank. The upper portion of the lower tank section 20, containing the sand 50, thus forms a filtering chamber below the upper flow chamber.

In accordance with one aspect of the present invention, the overdrain 39 and the sidewall of the upper tank section 21 cooperate to deliver the liquid to the sand bed, and to force the liquid into the bed, in a novel manner that avoids channeling of the flow through the sand, avoids excessive agitation of the bed, and also prevents the accumulation of a coating of filtered-out mud on the bed, thereby significantly increasing the filtering effectiveness of the filter and particularly increasing the capacity of the filter before backwashing is required. As a result, the frequency of backwashing is reduced to an extent that makes a sand bed commercially practical, and further permits the use of finer grades of sand than have been practical, heretofore, preferably on the order of No. 20 silica sand, for effective removal of substantially smaller dirt particles than has been possible with prior sand filters.

To the foregoing ends, the overdrain 39 includes means for dividing the incoming flow of liquid into a plurality of angularly spaced streams, and flattening and spreading the streams while inclining the same outwardly toward the curved sidewall of the upper flow chamber, which sidewall thus cooperates with the head in producing a downwardly directed swirling water flow along and across the full surface of the sand bed, to gently scrub and scour the top of the bed, thereby breaking up surface tension at the interface between the water and the bed and forcing the dirt deeply into the sand rather than merely depositing the dirt in a chocking layer on the bed. It has been observed that this action produces a gentle rolling action of a minor amount of the surface grains of sand around the surface of the bed without agitating the sand sufficiently to stir up dirt that previously been forced into the sand, the sand being sufficiently heavy to remain substantially in a compact bed during filtering.

More specifically, the overdrain 39 herein includes a disk-like inlet head 51 centered in the upper flow chamber and mounted on the upper end of the inlet pipe, the head being braced by a conical fitting 52 and including a horizontal bottom disk 54 formed with a center hole 53 through which water flows upwardly into the head. Spaced above and parallel to the bottom disk is a second disk 55 which has a plurality of shaped, dimple-like depressions 57, 58, 59 and 60, each depression having a bottom wall 62 pressed against the bottom disk and upright, vane-like sidewalls 63 and 64 extending between the two disks. The bottom walls are cemented to the bottom disk to hold the parts together.

It will be seen in FIGS. 3–6 that the sidewalls 63, 64 of adjacent depressions 57–60 are arranged in spaced pairs which define four outwardly extending flow passages 65, 66, 67 and 68 for carrying four streams of water outwardly from the center hole 53. The sidewalls are curved pinwheel-fashion to deflect the streams smoothly from the initial radial flows to flows that are inclined relative to the radii of the disks and the radii of the tank, the walls also diverging outwardly for a progressively increasing flow area. The vertical spacing of the disks is substantially less than the horizontal spacing of the sidewalls to flatten the streams.

As indicated by the arrows in FIG. 6, this inclination of the streams of water cooperates with the curvature of the tank sidewall, around the inlet head 51 and downward toward the sand 50, to produce the swirling downward flow of the water that continues all the way to the upper surface 50a of the sand. The swirling is clockwise as indicated in FIG. 4, and the general continuity of the flow is indicated by the arrows in FIG. 2. Thus, the sidewall of the upper tank section acts as a downward baffle for the incoming water and imparts a downward flow component thereto for the downward, spiraling flow of the water to the sand. Because of the effective angle of this wall and velocity of the entering streams, several convolutions can take place before the water reaches the sand surface 50a. The rate of flow and the number of convolutions, of course, will depend upon the output pressure and how clean the sand is at any given time, because the porosity of the sand bed determines the resistance to flow through the bed.

Figure 9:
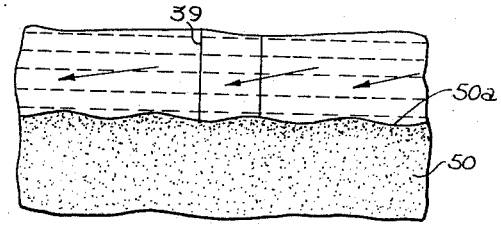
FIG. 9 is an enlarged cross-section taken along the line 9—9 of FIG. 2.
Figure 10:
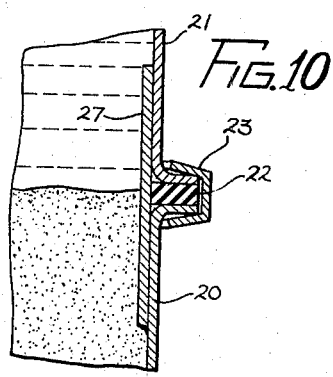
FIG. 10 is an enlarged fragmentary view of the parts within the arc 10 of FIG. 2.

Most important, the rotary flow of the water toward and across the sand surface 50a tends to drive the dirt particles into the sand while wiping and scouring the surface of the sand. It has been found that small ripples form on the surface, as shown, greatly enlarged, in FIG. 9, and that the only other disturbance of the bed is a gentle rolling of a few grains of sand along the surface. No surface mud is permitted to accumulate, and there is no noticeable stirring up of the sand or of the dirt that previously has been separated from the water.

In fact, examination of the sand bed has revealed that separated dirt accumulates to a substantially greater depth within the sand than has been the case in conventional sand filters, and that the accumulation at or near the surface, for a given period of operation, is substantially less than in conventional filters. In effect, a greater depth of sand is used for accumulation of the dirt, with a resultant reduction in the degree of clogging of the sand. Thus, a much longer period of filtering operation is available before backwashing is required.

Another important aspect of the improved filter 15 is the construction of the support 36 for the bed of sand 50. It is well known that the filtering effectiveness of any granular filter material depends upon the fineness of the particles and the resulting fineness of the interstices forming flow spaces in the bed between the paritcles. Thus, optimum filtering effectiveness calls for very fine sand, but the difficulty of supporting fine sand in a manner permitting thorough backwashing (and also the tendency of fine sand to clog rapidly), have led to a compromise use of larger particles, often backed by rocks.

In accordance with this aspect of the invention, the sand support 36 is a disk-like element mounted above the bottom of the tank 16 to form a lower flow chamber beneath the bed, and includes an open, grid-like frame structure formed by spaced struts 40 and radial struts or webs 41 defining relatively large, generally rectangular openings in the frame structure. This structure is covered by at least two side-by-side layers of fabric having openings smaller than the grain size of the sand and thereby forming a supporting screen for the sand. These fabric layers are peripherally secured to the frame structure so as to permit the central portions to billow upwardly in response to the backwashing flow so that the adjacent surfaces of the fabric layers rub abrasively against each other to dislodge any clogging material that may have accumulated in the fabric, algae growth being a particularly difficult problem in this respect. Thus, the use of two rubbing layers makes it practical to use finer fabric (and therefore finer sand) than previously was practical in sand filters.

In this instance, the grid-like frame structure preferably is molded of styrene while the fabric is vinyl-coated fiber glass. For use with fine sand such as the preferred No. 20 silica sand, a 30-by-30 mesh fabric is recommended. As shown most clearly in FIG. 7, the fabric layers are disk-shaped and are peripherally joined to a second set of such layers disposed below the frame structure, herein being sewn into a circular sheath that encloses the frame except for center holes in the two sets of layers. A washer 45 between the fitting 37 and the support 36 abuts against the top of the latter, and a spacer 46 around the pipe end 17a braces the central portion of the support while the edge of the support is nested against the sidewall of the lower tank section 20. A relief valve 49 is connected through the upper tank section 21 to the interior of the tank to allow air to escape from the tank as water flows in.

Figure 11:
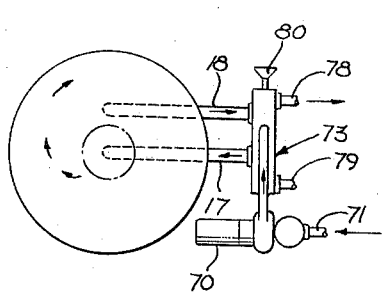
FIG. 11 is a schematic flow diagram similar to FIG. 1 showing the flow path when the filter is in normal filtering operation.

Thus, the sand support 36 divides the lower section 20 of the tank 16 into a filtering chamber above the support and a lower flow chamber 74 below the support, the lower chamber normally receiving filtered liquid through the entire width of the support to exit from the tank through the outlet pipe 18, that is, during normal filtering operation, as shown schematically in FIG. 11. During such operation, a pump 70 (FIG. 11) draws water from the swimming pool through a line No. 71 and pumps the water through a valve 73 to the inlet pipe 17 from which the water is discharged into the tank above the bed through the inlet 51.

As previously described, the head divides the flow into four streams which are flattened and inclined outwardly by the passages 65–68, to swirl downwardly toward and into the sand 50. After passing through the sand, the water flows through the support 36 into the lower flow chamber 74, and is returned to the pool through an outlet opening 75, the outlet pipe 18, and a valve 73 which normally delivers the outlet flow to a return line 78. A baffle 76 overlying the outlet 75 reduces the tendency of the water to flow directly into the outlet from the portion of the support 36 above the outlet.

Figure 12:
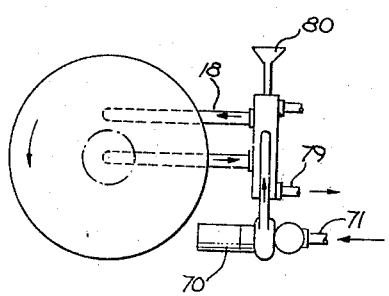
FIG. 12 is a schematic view similar to FIG. 11 showing the backwashing flow path.

When the sand 50 requires backwashing, the valve 73 is operated by an arm 80 to shift the output of the pump 70 to the outlet pipe 18, as indicated in FIG. 12, so that pool water is directed into the lower chamber 74. The baffle 76 deflects this flow laterally across the bottom of the sand support 36 and thus distributes the water for an even upward flow through all of the support and the entire width of the sand bed. Of course, the water first flows through the lower fabric layers, then through the frame structure, and then upwardly through the covering layers of fabric.

The water pressure from below acts against the fabric to raise the two layers as permitted by the peripheral support thereof, causing the layers to rub abrasively against each other as they billow upwardly. This assists the flow of water in loosening algae and grains of sand from the fabric, and thus cleans the fabric as well as the sand itself. After bubbling upwardly through the sand, the water passes through the overdrain 39, through the pipe 38 and the inlet pipe 17, and then through the valve 73 to the pipe for disposal. During backwashing, the valve 73 closes the pipe 78 leading to the pool.

From the foregoing, it will be seen that the curvature of the upper section 21 of the tank cooperates with the inlet head 51 to create the swirling downward flow for directing the liquid into the sand bed with the rotary, scouring action for preventing the accumulation of a layer of clogging mud on the bed while, at the same time, avoiding objectionable agitation of the sand sufficient to stir up collected dirt in the bed. Moreover, the multiple-layer sand support makes it possible to use sand of the fineness of No. 20 silica for more effective filtering without the expected clogging of the fabric screen by the sand and by algae growths. By distributing the backwashing flow across the full width of the support 36 with the baffle 76, the filter insures that virtually all of the screen and all of the sand will be cleaned. The result is a commercially practical swimming pool filter using sand as the filter medium.

It will be apparent from the foregoing that, while a particular form of the invention has been illustrated and described, various modifications can be made without departing from the spirit and scope of the invention.

What I claim is:

1. A filter for cleaning a flow of liquid, said filter comprising:

an upright tank having a hollow upper end section formed by a part-spherical sidewall of substantially circular cross-section in a horizontal plane and defining an upper flow chamber, and having a hollow lower section disposed below and joined to said upper section, said lower section defining a filter chamber;

a compact body of sand filling the upper portion of said filter chamber and having a substantially horizontal upper surface forming the lower end of said flow chamber;

means in said lower section spaced above the bottom thereof supporting said body of sand in spaced relation with said bottom and thereby defining a lower flow chamber beneath said body of sand, said supporting means being perforated for a flow of liquid through said sand between said flow chambers;

an inlet head in said upper flow chamber spaced above said upper surface for admitting the flow of liquid into said filter, said head being centered within said upper chamber and having means thereon for dividing said flow into a plurality of streams and flattening said streams horizontally while inclining the streams outwardly in angularly spaced relation toward said sidewall, thereby to create a swirling downward flow of liquid within said upper flow chamber toward said upper surface of said body of sand;

said upper chamber being unobstructed between said head and said upper surface to permit said swirling flow to continue uninterrupted to, along and through said upper surface for a rotary scouring action of said liquid as it penetrates the sand, and the sand being sufficiently heavy to remain in said compact body and avoid agitation of the sand and collected solids therein during filtering; and water outlet means in said lower flow chamber.

2. A filter as defined in claim 1 in which said supporting means comprise a grid-like frame structure supported above the bottom of said tank and having struts defining relatively large openings through said frame structure, and a screen covering said frame structure and having at least two side-by-side, normally contacting layers of fabric having openings smaller than the size of the particles of sand in said body, said layers of fabric being peripherally secured to said frame structure in a manner permitting upward billowing of the fabric during an upward flow of liquid through said supporting means thereby to scrub against each other and loosen accumulated matter clogging said screen.

3. A filter as defined in claim 1 in which said inlet head comprises spaced upper and lower generally horizontal walls, pairs of outwardly diverging vane-like sidewalls extending generally radially outwardly between said upper and lower walls to define passages for said streams, and a central inlet for admitting said flow into said head to flow outwardly in said streams.

4. A filter as defined in claim 3 in which said diverging sidewalls are curved pinwheel-fashion to turn said streams into inclined paths relative to the radii of said cross-section.

5. A filter for cleaning a flow of liquid said filter comprising:
  a tank having hollow upper and lower sections defining an upper flow chamber and a filter chamber below said flow chamber;
  a compact body of granular filter material of preselected grain size in said filter chamber having a generally horizontal upper surface forming the lower end of said flow chamber;
  a support for said filter material disposed below the latter and above the bottom of said tank, thereby defining a lower flow chamber, said support comprising a frame structure mounted on said tank and having struts defining relatively large openings through said structure, and at least two side-by-side layers of fabric overlying said frame structure and held thereon so as to be yieldable upwardly, said fabric layers normally lying in contacting relation with each other and defining openings smaller than said grain size, and having central portions for rising away from said frame structure in response to an upward flow of liquid from said lower chamber;
  and means normally operable to deliver liquid to said upper chamber to be filtered downwardly through said body to said lower chamber, and selectively reversible to deliver liquid to said lower chamber for a back-washing flow to said upper chamber, thereby to raise said layers and cause a rubbing action between
  them for removal of accumulated foreign matter.

6. A filter as defined in claim 5 in which said filter material is sand on the order of No. 20 silica sand, and said fabric is Fiberglass on the order of 30-by-30 mesh.

7. A filter as defined in claim 5 in which said layers of fabric are laid over said frame structure, and similar fabric layers extend under said structure and are peripherally secured to the overlying layers to form a sheath covering said structure.

8. A filter for cleaning a flow of liquid, said filter comprising:
  an upright tank having a hollow upper end section formed by a part-spherical sidewall of substantially circular cross-section in a horizontal plane and defining an upper flow chamber, and having a hollow lower section disposed below and jointed to said upper section, said lower section defining a filter chamber;
  a compact body of sand filling the upper portion of said filter chamber and having a substantially horizontal upper surface forming the lower end of said flow chamber;
  means in said lower section spaced above the bottom thereof supporting said body of sand in spaced relation with said bottom and thereby defining a lower flow chamber beneath said body of sand, said supporting means being perforated for a flow of liquid through said sand between said flow chambers;
  an inlet head in said upper flow chamber spaced above said upper surface for admitting the flow of liquid into said filter, said head being centered within said upper chamber and having means thereon for dividing said flow into a plurality of streams and flattening said streams horizontally while inclining the streams outwardly in angularly spaced relation toward said sidewall, thereby to create a swirling downward flow of liquid within said upper flow chamber toward said upper surface of said body of sand;
  said inlet head comprising spaced upper and lower generally horizontal walls, pairs of outwardly diverging vane-like sidewalls extending generally radially outwardly between said upper and lower walls to define passages for said streams, and a central inlet for admitting said flow into said head to flow outwardly in said streams;
  a pipe supported at its lower end on said lower section and extending upwardly through said supporting means and said body of sand, said inlet head being supported on the upper end of said pipe to receive liquid therethrough, and said sections being separable adjacent said upper surface for removal of said upper section without disturbing said head and said body of sand;
  said upper chamber being unobstructed between said head and said upper surface to permit said swirling flow to continue uninterrupted to, along and through said upper surface for a rotary scouring action of said liquid as it penetrates the sand, and the sand being sufficiently heavy to remain in said compact body and avoid agitation of the sand and collected solids therein during filtering;
  water outlet means in said lower flow chamber; and
  means for introducing liquid through said pipe and inlet head for a filtering flow through said sand, and revesely through said lower flow chamber to said inlet head for a backwashing flow through said sand.

9. A filter as defined in claim 8 in which said diverging sidewalls are curved pin-wheel fashion to turn said streams into inclined paths relative to the radii of said cross-section.

10. A filter as defined in claim 8 in which said supporting means is a disk-like element nested into the lower portion of said lower section above the bottom thereof and having openings smaller than the size of the grains of sand in said body.

11. A filter as defined in claim 10 in which said element comprises a grid-like frame structure formed by struts defining relatively large openings, and at least two side-by-side, normally contacting layers of fabric having openings smaller than said grain size and peripherally secured to said frame structure.

12. A filter as defined in claim 11 in which said sand is on the order of No. 20 silica sand and said fabric is Fiberglas fabric of a mesh on the order of 30 by 30.

References Cited

UNITED STATES PATENTS

| | | | |
|---|---|---|---|
| 967,554 | 8/1910 | Rarick | 210—289 X |
| 1,015,051 | 1/1912 | Martin | 210—289 X |
| 1,205,743 | 11/1916 | Hoke | 210—266 X |
| 2,043,734 | 6/1936 | Camp | 210—289 X |
| 2,458,893 | 1/1949 | Campbell | 210—288 X |
| 2,529,398 | 11/1950 | Krieck | 210—289 X |
| 2,874,847 | 2/1959 | Diamond | 210—304 X |

SAMIH N. ZAHARNA, Primary Examiner

U.S. Cl. X.R.

210—277, 288, 289